April 13, 1954
C. W. BERTHIEZ
2,675,419
SUSPENSION DEVICE FOR CONTROL BOXES
Original Filed April 7, 1948
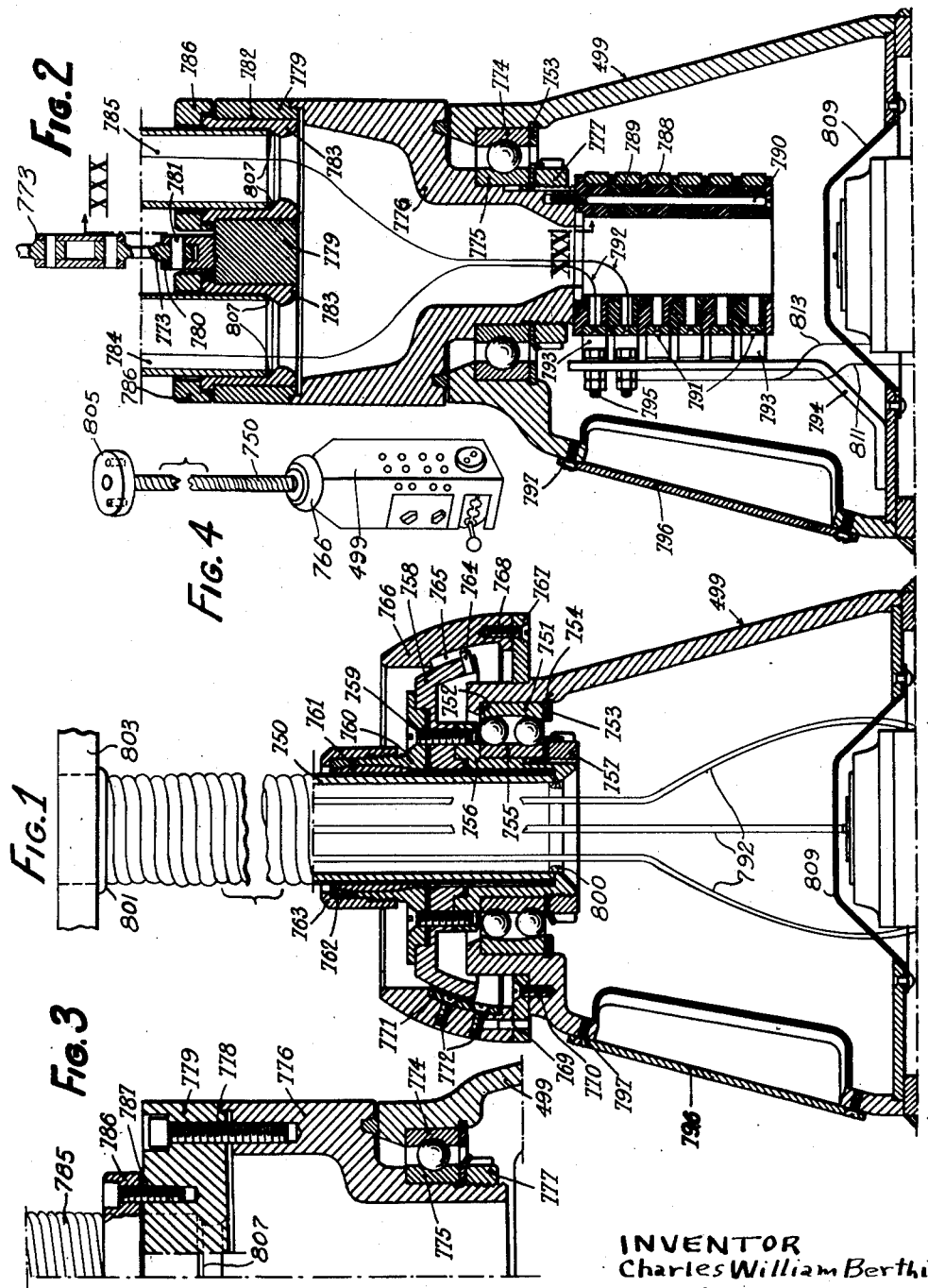
INVENTOR
Charles William Berthiez
By George H Corey
ATTORNEY Patented Apr. 13, 1954

2,675,419

UNITED STATES PATENT OFFICE 2,675,419

SUSPENSION DEVICE FOR CONTROL BOXES

Charles William Berthiez, Paris, France

Original application April 7, 1948, Serial No. 19,454. Divided and this application January 26, 1950, Serial No. 140,657

Claims priority, application France December 22, 1947

6 Claims. (Cl. 174—65)

This invention relates to apparatus for controlling the operation of machine tools, hoisting apparatus and the like. The invention more particularly relates to control boxes or the like associated with apparatus and devices for effecting control of the movable members of such machines.

It has been proposed heretofore to suspend pendant control boxes at the end of a sheath enclosing all the electric cables connecting the control members carried by said control boxes with contactors controlling the motors driving the different members of the machine. However, such prior control boxes are not capable of adaptation for all the positions of the operator, which greatly interferes with the work of said operator.

It is an object of the invention to provide a pendant control box of compact construction which may be flexibly supported for movement about the machine as well as upwardly and downwardly and which provides in addition for rotation of the control box on a vertical axis, so that the operator may move the box into the most convenient position for inspecting the work while having the box and the control members carried thereby continually at hand and in visual range.

Other objects and features of the invention will appear from the following description taken in connection with the drawings which show two embodiments of a pendant control box. Moreover, certain structural features of the control boxes which constitute improvements upon the prior art devices will be understood from the description to be given in connection with these drawings in which:

Fig. 1 is a vertical section of the suspension means for a pendant control box designed according to the invention;

Fig. 2 is also a vertical section showing a modification of the suspension means shown in Fig. 1;

Fig. 3 is a section on line XXX—XXX of Fig. 2.

Fig. 4 is a perspective view of the suspended control box.

I will now describe with reference to Figs. 1, 2 and 3 the construction of the suspension means for the pendant control box 499 connected at its upper end to this suspension means.

According to a first embodiment illustrated in Fig. 1 the pendant control box 499 is suspended, by means about to be disclosed, from the lower end of a sheath 750 attached at its upper end to an overhead support 805 as shown in Fig. 4, through which sheath electric cables 792 may pass which connect the different controlling and signalling members of the pendant control box, such as levers, push buttons, lamps, and the like, to the relays and auxiliaries used for the control of the different motors driving the movable members of the machine.

The control box 499 itself is formed at its upper end to receive the outer race 751 of a self-aligning ball bearing provided with two rows of balls, this race being positioned between a shoulder 752 machined in the control box 499 and a clip ring 753 housed in a groove 754 also formed in the upper end of the control box 499.

The inner race 755 of the ball bearing is carried by a sleeve 756 the lower threaded part of which is adapted to receive a nut 757 locking the race 755 against a shoulder on the sleeve 756. This sleeve is welded at 800 to the lower end of the sheath 750 the upper end of which is welded at 801 in overhead support 803. The sleeve 756 carries an inverted cup shaped member 758 secured to the sleeve 756 by means of screws 759 which fasten to the sleeve at the same time a flanged socket 760. This socket cooperates with an expansible sleeve 761 the two ends of which are tapering, the lower end of this sleeve 761 cooperating with the lower correspondingly tapering inner surface of the flanged socket 760 while the upper end of the expansible sleeve 761 cooperates with the inner frusto-conical surface of washer 762 held in place by means of a nut 763 threaded on the outer surface of the flanged socket 760. The object of this mounting is to reinforce the means for securing the sheath as above described through welding between the terminal sleeve 756 and the sheath 750. The electrical cables 792 extend downwardly from the mouth of the sheath 750 freely across the space at the upper part of the box 499 and through holes in partition 809 into the main body of the box 499 where they are connected to the electrical control parts contained within the box and operated by the levers, push buttons, etc., above referred to and shown diagrammatically in Fig. 4.

The inverted cup shaped member 758 is provided with a projection or stud 764 serving as an abutment for limiting the rocking motion of the control box and adapted to cooperate with the shoulder of a recess 765 formed at the inside of an outer inverted cup shaped member 766 rigid with an annular part 767 to which it is secured through screws 768. Centering pins 769 provide for the concentricity of the mounting of the outer cup shaped member 766 with the other parts disposed on the axis of the ball bearing with the other parts disposed on the axis of rotation of the ball bearing. The annular part 767 is secured to the upper portion of the control box 499 by any suitable means, such as screws 770.

An abutment 771 is secured inside the outer inverted cup shaped member 766 by means of screws 772 and serves for limiting the rotary movement of the control box with reference to the inner inverted cup shaped member 758 through engagement with the stud 764 fastened in the inner inverted cup shaped member.

The operation of the arrangement that has just been described will be clear. By reason of the control box 499 being mounted on a self-aligning ball bearing mounted on the sleeve 756 secured to the lower end of the sheath 750 it is possible to produce rotation of the control box about a substantially vertical axis through an angle of nearly 360° limited only by the engagement between the stud 764 and the abutment 771. The object of such limitation is to prevent the rotation of the control box 499 through more than one revolution in order to avoid damage to the electric cables leading to it through sheath 750. It is apparent that the mounting disclosed, in addition to a rotary movement upon a substantially vertical axis, allows also for some inclination of the control box for greater convenience of operation by the operator of the machine. The extent of this inclination is limited by the engagement of the stud 764 with the shoulder of recess 765 of the inverted cup shaped member 766.

Fig. 2 shows a mounting which is somewhat different from that of Fig. 1 in being constructed for unlimited rotation of the control box 499 about the vertical axis. In this embodiment the control box 499 is suspended from the machine frame by means of a chain 773 instead of by means of sheath 750 enclosing the electric cables.

According to this embodiment, the control box 499 itself is supported by an outer race 774 of a ball bearing which is held in place as in the preceding embodiment by means of a clip ring 753. The inner race 775 of the ball bearing is mounted on a hub 776 against a shoulder formed thereon and is held fast on this hub by means of nut 777. The hub 776 is secured by means of screws 778, as shown in Fig. 3, to the supporting head 779 which carries the yoke piece 780, Fig. 2, through which pin 781 passes for engaging the lower end of the suspension chain 773. The head 779 is provided with two openings 782 therethrough which receive the terminal sleeves 783 for corresponding sheaths 784, 785 welded thereto at 807 and serving for leading the electric cables to the inside of the control box 499. The terminal sleeves 783 respectively are held in place by means of flanges 786 secured to the supporting head 779 by means of screws 787 as illustrated in Fig. 3. Thus the weight of the control box 499 is supported not by the sheaths 784, 785 protecting the electric cables but by the chain 773.

The means which provides for unlimited rotation of the control box in the embodiment of Figs. 2, 3 is constituted by a system of conductive slip-rings and brushes cooperating therewith which are coaxial with the axis of rotation of the control box 499. The slip-rings 788, Fig. 2, are mounted on insulating rings 789 stacked upon one another and secured to the base of the hub 776 by means of screws 790. The slip-rings 788 are provided each with a counter-sunk hole 791 in which may be soldered the ends of the electric wires 792.

The conductive slip-rings 788 are in contact with the current collecting brushes 793 secured by means of bolts 795 to an insulating arm 794 fastened to the control box 499, the bolts 795 acting also as terminals for conductors 811, 813 passing through holes in the partition 809 as in Fig. 1.

It is apparent that this arrangement makes it possible to rotate the control box 499 through any desired angle. Moreover, even if the control box is rotated through more than one or several complete revolutions in the same direction this will not result in any torsional stress in the electric cables 792, 811, 813 because relative movement is provided between the brushes 793 and the conductive slip-rings 788.

In both embodiments described an inspection door 796 secured by screws 797 serves for the mounting of the control box on the suspension means used and for checking the state of the connections during operation.

This application is a divisional application of the application Serial No. 19,454 filed April 7, 1948, which was itself a continuation-in-part of the applications Serial No. 691,362 filed August 17, 1946, and Serial No. 780,670 filed October 13, 1947, both now abandoned.

What I claim is:

1. A suspension device for a pendant control box carrying a plurality of individual electric control elements operable on at least one face of the box for controlling the operation of a machine tool or the like when operatively connected thereto, said device comprising a hollow suspension member disposed above said control box and providing within said member a substantially unobstructed space through which centrally of the space an axis of rotation of said control box extends generally vertically, said space being adapted to receive a plurality of flexible wires or the like extending through said space along said axis for connection to said control elements of said box, a hollow elongated flexible member providing therewithin space for said wires to extend lengthwise therethrough and connected at one end to said hollow suspension member and adapted to be attached at its other end to a support disposed above said suspension member for supporting said suspension member and said control box, and an anti-friction bearing disposed between said suspension member and said control box, said bearing having a part supported by said suspension member and another part supported by said first part in bearing relation to said first part and for rotation of said parts relative to each other on said generally vertically extending axis of rotation, said other part being connected to said control box to support said control box for rotational movement of said control box together with said other part relative to said suspension member, said bearing being of annular form providing a space for said wires, said flexible member and said hollow suspension member and said antifriction bearing being capable of sustaining the weight of said control box while providing for said rotational movement thereof, said anti-friction bearing comprising a rolling element between and in rolling relation to said parts to provide for said rotational movement of said parts relative to each other on said axis and said weight sustaining bearing therebetween.

2. A suspension device as defined in claim 1 which comprises a stop member connected to one of said parts of said bearing to rotate therewith relative to said other part, and an abutment connected to said other part of said bearing to rotate therewith relative to said first part and adapted to engage said stop member for limiting the extent of said rotational movement.

3. A suspension device as defined in claim 1 in which said anti-friction bearing is a ball bearing having one of its rings supported by said suspension member and the other ring connected to said control box to support the weight thereof.

4. A suspension device for a pendant control box carrying a plurality of individual electric control elements operable on at least one face of the box for controlling the operation of a machine tool or the like when operatively connected thereto, said device comprising a hollow suspension member disposed above said control box and providing within said member a substantially unobstructed space through which centrally of the space an axis of rotation of said control box extends generally vertically, said space being adapted to receive a plurality of flexible wires or the like extending through said space along said axis for connection to said control elements of said box, a hollow elongated flexible member providing therewithin space for said wires to extend lengthwise therethrough and connected at one end to said hollow suspension member and adapted to be attached at its other end to a support disposed above said suspension member for supporting said suspension member and said control box, and an anti-friction bearing disposed between said suspension member and said control box, said bearing having a part supported by said suspension member and another part supported by said first part in bearing relation to said first part and for rotation of said parts relative to each other on said generally vertically extending axis of rotation, said other part being connected to said control box to support said control box for rotational movement of said control box together with said other part relative to said suspension member, said bearing being of annular form providing a space for said wires, said flexible member and said hollow suspension member and said anti-friction bearing being capable of sustaining the weight of said control box while providing for said rotational movement thereof, said anti-friction bearing comprising a rolling element between and in rolling relation to said parts to provide for said rotational movement of said parts relative to each other on said axis and said weight sustaining bearing therebetween, one of said parts providing a spherical surface extending about said vertical axis and engaged by said rolling element for rolling movement of said element in a vertically extending plane to provide for tilting movement of said parts relative to each other about an axis transverse to said vertical axis and swinging movement of said control box relative to said suspension member.

5. A suspension device as defined in claim 4 which comprises a stop member connected to one of said parts of said anti-friction bearing to tilt therewith relative to the other of said parts, and an abutment connected to said other part of said anti-friction bearing to tilt therewith relative to said first part and adapted to engage said stop member for limiting the extent of said swinging movement of said control box relative to said suspension member.

6. A suspension device as defined in claim 4 which comprises a stop member connected to one of said parts of said anti-friction bearing to rotate and to tilt therewith relative to the other of said parts, and abutment means connected to said other part of said anti-friction bearing to rotate and to tilt therewith relative to said first part and adapted to engage said stop member for limiting the extent of said rotational movement and of said swinging movement of said control box relative to said suspension member.

References Cited in the file of this patent

UNITED STATES PATENTS

| Number | Name | Date |
|---|---|---|
| 253,366 | Garber | Feb. 7, 1882 |
| 886,262 | Smith | Apr. 28, 1908 |
| 1,824,604 | Lederle | Sept. 22, 1931 |
| 2,309,316 | Hollander | Jan. 26, 1943 |
| 2,416,498 | Ruddock | Feb. 25, 1947 |
| 2,521,574 | Findley | Sept. 5, 1950 |

FOREIGN PATENTS

| Number | Country | Date |
|---|---|---|
| 612,952 | France | Aug. 10, 1926 |